United States Patent [19]

Smith

[11] 4,221,367

[45] Sep. 9, 1980

[54] GAS SPRING WITH TWO-STAGE DAMPING

[75] Inventor: Lawther O. Smith, Doylestown, Pa.

[73] Assignee: Gas Spring Corporation, Montgomeryville, Pa.

[21] Appl. No.: 953,764

[22] Filed: Oct. 23, 1978

[51] Int. Cl.$^2$ .................. B60G 11/26; F16F 3/00
[52] U.S. Cl. .................................. 267/64 R; 188/284
[58] Field of Search .................. 267/64 R, 124, 120, 267/126, 127, 129; 188/284, 311; 200/61.62

[56] References Cited
U.S. PATENT DOCUMENTS

| | | | |
|---|---|---|---|
| 3,175,645 | 3/1965 | Schafer et al. | 188/311 |
| 3,625,320 | 12/1971 | Doetsch et al. | 267/64 R X |
| 3,919,509 | 11/1975 | Schnitzius | 200/61.62 |
| 3,963,227 | 6/1976 | Mölders | 267/120 |
| 4,030,716 | 6/1977 | Freitag | 267/64 R |

Primary Examiner—Douglas C. Butler
Attorney, Agent, or Firm—Brumbaugh, Graves, Donohue & Raymond

[57] ABSTRACT

A gas spring comprises an annular oil cushion seal near the main seal end of the cylinder which defines an oil cushion chamber with the main seal. A flow-restricting passage through the oil cushion seal permits controlled flow of gas and oil from the rod chamber to the oil cushion chamber to provide a second phase of damping as the rod nears the fully extended position and bypass communication from the tube chamber to the rod chamber is via the damping passage in the oil cushion seal and the main damping passage which bypasses the piston, which passages are in series at the end of the operating stroke. The second stage of damping essentially eliminates oscillation of the gas spring at the end of the operating stroke.

1 Claim, 2 Drawing Figures

GAS SPRING WITH TWO-STAGE DAMPING

BACKGROUND OF THE INVENTION

The present invention relates to a gas spring which has two stages of damping and is essentially free of oscillation at the end of the operating stroke.

It has been common practice to provide a small amount of oil in the cylinder of a gas spring to lubricate the piston rod, increase the effectiveness of the main seal and reduce friction between the rod and the main seal. In some designs, the oil in the cylinder is also used to slow the speed of the rod near the end of the operating stroke. In gas springs intended for rod-down operation, the oil resides in the bottom of the cylinder adjacent the main seal. The piston has a flow-restricting passage which permits, during most of the stroke of the rod, gas to flow past the piston at a controlled rate. When the piston contacts the oil near the bottom of the cylinder, the oil passes through the flow-restricting passage in the piston. The oil, though it flows more slowly through the passage than the gas, often does not slow the piston enough to prevent vibration and oscillation of the rod at the end of the operating stroke.

In gas springs intended for rod-up operation, essentially the same oil lubrication and damping system is commonly provided. However, the flow-restricting passage which bypasses the piston and allows both gas and oil to move from the rod chamber to the cylinder chamber opens to the rod chamber a sufficient distance above the upper face of the piston to permit a quantity of oil to be trapped and to be carried up by the piston. The oil eventually strikes the main seal and is forced through the flow-restricting passage back to the cylinder chamber; the final oil-damped stage of rod movement is at a slower speed, but the oscillation problem is much the same as it is in the rod-down design.

SUMMARY OF THE INVENTION

There is provided, in accordance with the present invention, a gas spring which provides two stages of damping and essentially eliminates vibration or oscillation of the piston rod at the end of rod movement.

In particular, a gas spring, in accordance with the present invention, has an annular oil cushion seal between the rod and cylinder near the main seal end of the cylinder which defines with the main seal an oil cushion chamber in the cylinder. A flow-restricting passage (or passages) through the oil cushion seal permits gas and oil above the piston to be forced into the oil cushion chamber. Like previously known rod-up gas springs, the piston is bypassed by a main flow-restricting passage which opens to the rod chamber some distance above the top of the piston, thus to allow oil to be carried up with the piston during the operating stroke. During most of the stroke from the retracted to the extended position of the rod, therefore, rod movement is damped as a function of the rate at which the gas bypasses the piston through the main flow-restricting or damping passage.

Near the end of the operating stroke, the main bypass passage across the piston is briefly closed by the annular seal and then opens to the oil cushion chamber. This occurs at about the same time as the upper level of the oil becomes trapped between the oil cushion seal and the piston. Accordingly, the oil trapped above the piston must pass the flow-restricting passage through the seal, thus providing a second stage of damping, the characteristics of which are controlled in part by the flow-restricting passage through the oil cushion seal and in part by the main damping passage which by-passes the piston. During the second stage of damping, the two flow-restricting passages work in series, and this permits the damping system to be designed to slow the rod appreciably and eliminate oscillation at the end of the operating stroke while retaining an optimum damping condition during the major part of the operating stroke.

Thus, the invention provides, in a relatively simple manner at very little additional cost, two-stage damping of the rod movement which eliminates objectionable oscillation of the rod at the end of the operating stroke. For a further understanding of the invention, reference may be made to the following description of an exemplary embodiment, taken in conjunction with the figures of the accompanying drawing.

DESCRIPTION OF EXEMPLARY EMBODIMENT

Figure 1:
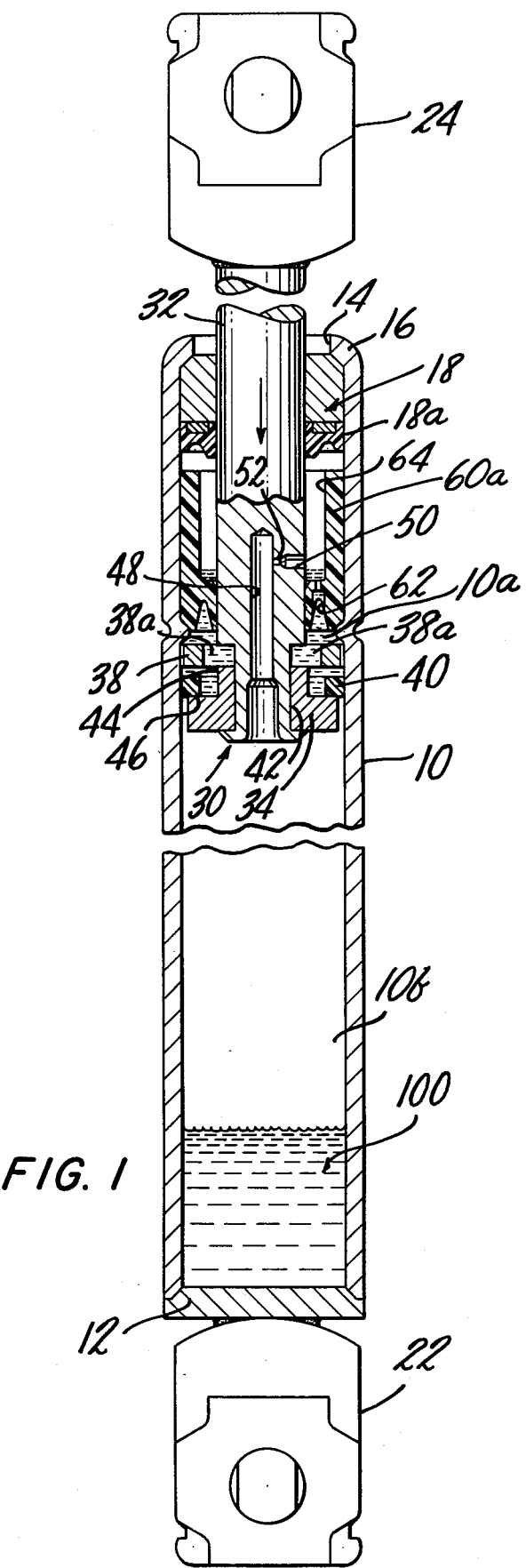
FIGS. 1 and 2 are side cross-sectional views of the embodiment showing it in two different stages of operation.

The gas spring shown in the drawing is intended for rod-up operation but can be used in a rod-down position as well. In overall, basic construction it is similar to a gas spring which has been marketed by the assignee of the present invention for some time. It includes a gas-tight cylinder 10 which is closed at its lower end 12 and has at an opening 14 in the upper end 16, a gas and liquid impervious end closure and main seal assembly 18. A piston rod 32 slides in and out through the end assembly. Gas under very high pressure, usually in excess of ten atmospheres, is provided in the sealed cylinder 10. The gas spring includes a fitting 22 attached to the lower end 12 of the cylinder and a fitting 24 at the upper end of the piston rod 32 for attaching the gas spring to relatively movable devices which the gas spring is used with. For example, the lower fitting 22 can be attached to a vehicle body and the upper fitting 24 to the tailgate door, the hatchback door, the trunk door or the engine compartment hood of a car or station wagon, in which case the gas spring applies forces on the operating stroke to counterbalance or lift the door or other vehicle part. Part of the volume within the cylinder is filled by a small amount of oil 100.

A piston assembly 30 at the lower end of a piston rod 32 subdivides the cylinder into a rod chamber 10a and a tube chamber 10b, the volume of each of which varies depending upon the position of the piston rod. The piston assembly consists of a main body 34 received on a reduced diameter portion 42 of the piston rod 32, a retaining washer 38 having slots 38a spaced circumferentially around the inner portion and a sliding piston seal 40 received within a groove 44 of the body 34 with a residual clearance in the axial direction.

In a rod-up installation when the piston rod 32 is pushed from an extended to a retracted position in the cylinder (as indicated by the arrow pointing down in FIG. 1), the gas in the tube chamber 10b can pass quite freely by the piston by flowing through the annular clearance between the piston body 34, through the clearance which is then located below the seal 40 (because the seal drags on the wall and stays up when the rod moves down), and through the slots 38a in the piston remaining ring 38. When the piston nears the bottom of the cylinder (a position not shown in the drawing) some of the oil (100) in the bottom of the cylinder flows by the piston and ends up at a level somewhat above the upper face of the piston assembly.

Figure 2:
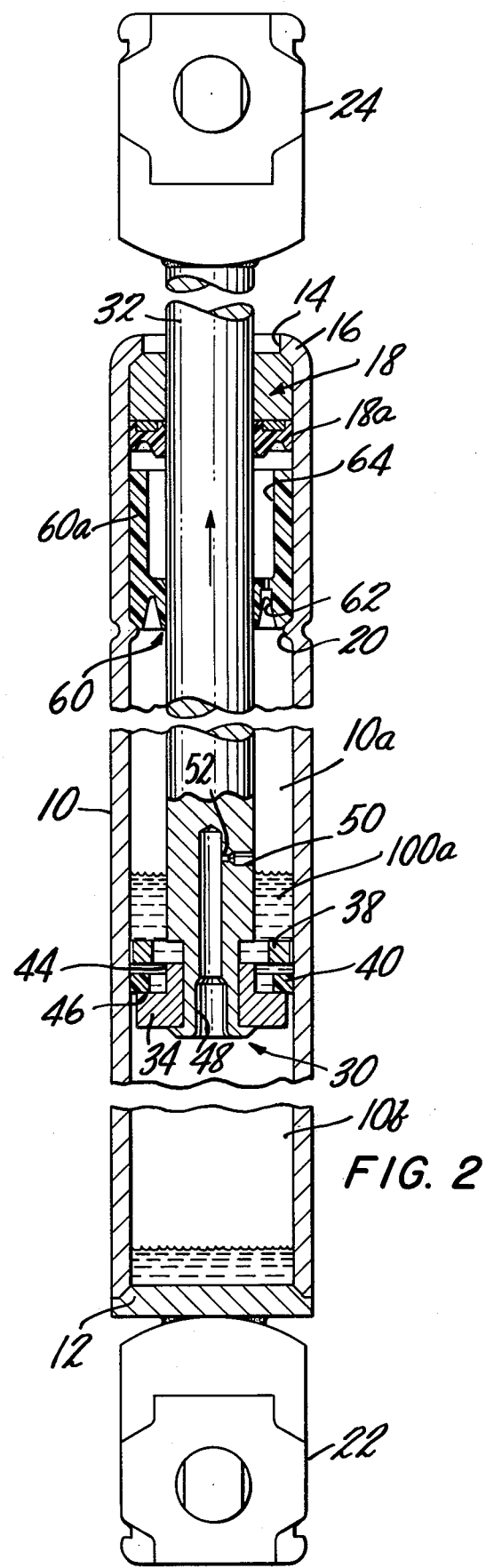

When the components with which the gas spring is used are released (for example, when the hatchback door of a car is unlatched), the gas under pressure in the cylinder forces the piston rod to move out of the cylinder. In order to do so, the gas in the cylinder must bypass the piston by moving from the rod chamber 10a to the tube chamber 10b. Accordingly, there is a bypass passage which consists of a hole 48 extending axially into the lower end of the piston rod 32, a flow-restricting orifice 52 branching off from the hole 48 and a radial hole 50 leading from the orifice 52 out to the surface of the rod 32. The orifice 52 controls the gas flow rate from the rod chamber 10a to the cylinder chamber 10b, thus damping the outward movement of the piston rod 32 during the operating stroke. At the beginning of outward movement of the piston rod 32, the piston seal 40 attains the lower seated position shown in FIG. 2, thus closing off the annular path between the rod and tube chambers.

As described up to this point, the gas spring shown in the drawing is conventional and in widespread use. But for the present invention, the final stage of outward movement of the piston rod on the operating stroke would be damped by trapping of the oil carried up with the piston between the piston and the upper end of the cylinder. The oil would then flow through the orifice 52 to permit completion of the operating stroke. At the point when the oil becomes trapped, the rod slows, but often not enough to prevent oscillation at the end of the stroke.

The improvement, according to the present invention, is the provision of an annular oil cushion seal 60 near the upper end of the cylinder 10 which defines with the main seal 18 an annular oil cushion chamber 64. In the embodiment, the seal 60 is a generally cup-like lip seal and includes a sleeve portion 60a extending some distance above the sealing part. The sleeve portion acts as a spacer for locating the seal but is not required if some other means of fixing the location of the seal is provided. The seal 60 has a flow-restricting passage 62 which permits gas and oil to flow into the oil cushion chamber 64 from the rod chamber 10a.

During the operating stroke in the rod-up position, upward movement of the piston rod is damped throughout most of the operating stroke by the controlled flow of gas from the rod chamber 10a to the tube chamber 10b through the main damping orifice 52. This stage of damping continues until the hole 50 becomes closed by the oil cushion seal 60. For a brief time, the gas above the piston assembly in the rod chamber 10a and the oil cushion chamber 64 is compressed, thus tending to slow the rod, but the hole 50 in the main damping bypass system very soon opens to the oil cushion chamber 64. Meanwhile, at some time during movement of the hole 50 from the tube chamber to the oil cushion chamber the oil 100a carried up with the piston assembly strikes the oil cushion seal 60 and begins to be forced through the oil cushion damping passage 62. As soon as the main damping orifice 52 opens to the oil cushion chamber 64, a second stage of damping begins. The second stage of damping involves flow of gas and oil from the rod chamber 10a through the oil cushion damping passage 62 into the oil cushion chamber 64 and from the oil cushion chamber through the main damping passage 52 into the tube chamber. During the second stage of damping, the main damping passage and the oil cushion damping passage are in series. The main damping passage can be designed to provide the desired damping effect throughout the major part of the operating stroke, while the oil cushion damping passage can be designed to increase the damping during the final or second stage of damping to slow the rod and eliminate oscillation at the end of the operating stroke.

When the rod is again pushed back into the cylinder, whatever oil remains trapped in the oil cushion chamber will soon drain through the damping passage 62 back to the bottom of the cylinder. Meanwhile, as the rod moves back down, it is lubricated by the oil trapped in the oil cushion chamber 64. Thus, the invention provides the further benefit of lubricating the rod during each full cycle of operation of the gas spring.

The gas spring described above and shown in the drawing can also be used in a rod-down installation and will, in such a configuration, provide two-stage damping. In the retracted position, the oil in the cylinder will collect in the oil cushion chamber and may cover the oil cushion seal to a level somewhat above the seal but only to a height somewhat less than the distance between the piston and the hole 50. When the rod moves out, the gas in the rod chamber bypasses the piston through the main damping orifice 52 until the hole 50 passes through the oil cusion seal and opens to the oil cushion chamber 64. Meanwhile, when the hole 50 is closed by the seal 60 for a brief time (which normally occurs only near the lip end of the seal 60), gas trapped below the piston is compressed. When the hole 50 opens to the oil cushion chamber 64, the second stage of damping, in which the main damping passage 52 and oil cushion damping passage 62 are in series, begins. The piston movement is thus slowed and the rod reaches the end of the operating stroke without noticeable oscillation.

In the foregoing description, all references to rod-up or rod-down installations are intended to refer only very generally to the orientation of the gas spring. In most cases, the gas spring will not lie with its axis truly vertical and will move through an arc in operation, and the oil surface will lie obliquely at varying angles to the axis of the cylinder. The fill level of the oil and the characteristics of the damping systems can be designed as a matter of ordinary engineering skill, to provide the desired results within the parameters of a particular end use.

The embodiment described above and shown in the drawing is intended to be merely exemplary, and numerous variations and modifications will be apparent to those skilled in the art without departing from the spirit and scope of the invention. For example, whereas the second-stage damping fluid has been referred to herein as oil, it will be understood that any suitable damping fluid may be used. Also, although only a single oil cushion chamber 64 is illustrated, it will be appreciated that multiple damping stages can be provided by adding additional oil cushion chambers in series. All such variations and modifications are intended to be included within the scope of the invention as defined in the appended claims.

I claim:

1. In a gas spring which includes a gas-tight cylinder containing a gas under pressure and a body of oil, a piston rod movable through a main seal adjacent one end of the cylinder, a piston on the rod subdividing the cylinder into variable volume tube and rod chambers, and a flow-restricting bypass passage communicating the tube chamber to the rod chamber through an opening at a location on the rod spaced axially from the rod side of the piston, the improvement comprising an annular oil cushion seal adjacent the seal end of the cylinder interposed between the cylinder and rod and spaced axially from the main seal to define with the main seal an oil cushion chamber, and a flow-restricting passage through the oil cushion seal communicating the rod chamber with the oil cushion chamber for permitting controlled flow of gas and oil from the rod chamber to the oil cushion chamber as the rod nears the fully extended position, thus to afford a second damping stage near the end of an operating stroke when the bypass passage opens to the oil cushion chamber and communication from the rod chamber to the tube chamber is via the oil cushion chamber and both flow-restricting passages in series.

* * * * *